US009930015B2

(12) United States Patent
Graubner et al.

(10) Patent No.: US 9,930,015 B2
(45) Date of Patent: Mar. 27, 2018

(54) COMMUNICATION DEVICE AND METHOD FOR PERFORMING ENCRYPTED COMMUNICATION IN MULTIPOINT NETWORKS

(71) Applicant: Rohde & Schwarz SIT GmbH, Berlin (DE)

(72) Inventors: Andreas Graubner, Berlin (DE); Stefan Roehrich, Berlin (DE); Bernhard Heep, Berlin (DE)

(73) Assignee: Rohde & Schwarz SIT GmbH, Berlin (DE)

( * ) Notice: Subject to any disclaimer, the term of this patent is extended or adjusted under 35 U.S.C. 154(b) by 164 days.

(21) Appl. No.: 14/886,299

(22) Filed: Oct. 19, 2015

(65) Prior Publication Data
US 2017/0054691 A1    Feb. 23, 2017

(30) Foreign Application Priority Data

Aug. 19, 2015 (EP) ..................................... 15181508

(51) Int. Cl.
*H04L 9/32* (2006.01)
*H04L 29/06* (2006.01)
*H04L 9/08* (2006.01)

(52) U.S. Cl.
CPC ........ *H04L 63/0428* (2013.01); *H04L 9/0822* (2013.01); *H04L 9/0838* (2013.01); *H04L 9/0841* (2013.01); *H04L 2209/24* (2013.01)

(58) Field of Classification Search
None
See application file for complete search history.

(56) References Cited

U.S. PATENT DOCUMENTS 9,002,018 B2 *  4/2015  Wilkins .................. H04L 9/006
380/281
2010/0042841 A1    2/2010  King

FOREIGN PATENT DOCUMENTS

EP    0405215    1/1991
EP    0477180    8/1994
(Continued)

OTHER PUBLICATIONS

Extended EP Search Report dated Feb. 4, 2016 for corresponding EP Patent Application 15181508.1, 9 pages.
(Continued)

*Primary Examiner* — Brandon S Hoffman
(74) *Attorney, Agent, or Firm* — Lee & Hayes, PLLC

(57) ABSTRACT

A communication device for performing encrypted communication with at least one further communication device in a communication network is provided. Advantageously, the device is adapted to communicate with a plurality of further communication devices. The communication device comprises a communication unit and a cryptographic unit. Moreover it comprises a key encryption key generator configured to generate at least one key encryption key jointly with the at least further communication device, using the communication unit. Also, it comprises a traffic encryption key generator configured to generate a traffic encryption key, specific to the communication device, for encrypting traffic data by the communication device. The cryptographic unit is preferably configured to encrypt the traffic encryption key using the at least one key encryption key. Moreover, the communication unit is preferably configured to transmit the encrypted traffic encryption key to the at least one further communication device.

20 Claims, 5 Drawing Sheets

(56) References Cited

FOREIGN PATENT DOCUMENTS

| EP | 0669741 | 8/1995 |
| EP | 1119132 | 7/2001 |

OTHER PUBLICATIONS

Menezes et al., Handbook of Applied Cryptography, CRC Press, 1996, pp. 543-590.

* cited by examiner

COMMUNICATION DEVICE AND METHOD FOR PERFORMING ENCRYPTED COMMUNICATION IN MULTIPOINT NETWORKS

PRIORITY

This application claims priority of European Patent Application EP 15 181 508.1 filed on Aug. 19, 2015.

FIELD OF THE INVENTION

The invention relates to encrypted communication in communication networks requiring only minimal centralized hardware.

BACKGROUND OF THE INVENTION

So far, in communication networks, performing an encrypted communication between two devices requires a prior knowledge of the two devices with regard to each other. In systems with only two devices, this can easily be achieved by directly establishing a secure channel and exchanging certificates assuring the identity of the devices. In communication networks with a high number of communication devices though, certificate authorities are used for providing certificates to the individual communication devices. Each device is authenticated by the certificate authority with regard to the other devices. For example the European patent EP 0 477 180 B1 shows such a communication system.

Moreover it is known to use key servers for directly providing traffic encryption keys to the devices. The devices then use these traffic encryption keys for encrypting traffic data, they wish to exchange.

It is though disadvantageous to use such a key server, since it has to be online at all times, so that a communication device can request a traffic encryption key at all times.

Accordingly, one object of the invention among others is to provide a communication device and a communication method, which allow for a secure communication of a plurality of communication devices within a communication network while requiring only minimal centralized always online hardware.

SUMMARY OF THE INVENTION

According to one aspect of the invention a communication device for performing encrypted communication with at least a further communication device in a communication network comprises a communication unit and a cryptographic unit. Moreover it comprises a key encryption key generator configured to generate at least one key encryption key jointly with the at least one further communication device, using the communication unit. Also, it comprises a traffic encryption key generator configured to generate a traffic encryption key, specific to the communication device, for encrypting traffic data by the communication device. It is thereby possible to create a secure channel between the communication devices without requiring a constantly available centralized hardware.

Especially in multi-point networks, it is advantageous that the non-encrypted traffic data leads to encrypted data packets, which any communication device is able to decrypt, no matter, which communication device is the target of the data packet. Redundant transmissions can thereby be prevented. Also, the encryption can be performed without the encrypting communication device knowing, which further communication device the traffic data is to be transported to.

The cryptographic unit is preferably configured to encrypt the traffic encryption key using the at least one key encryption key. Moreover, the communication unit is preferably configured to transmit the encrypted traffic encryption key to the at least one further communication device.

Advantageously, the cryptographic unit is furthermore configured to encrypt traffic data using the traffic encryption key. The communication unit then is furthermore adapted to transmit the traffic data encrypted with the traffic encryption key. By use of such a symmetric traffic encryption key, a high degree of transmission security and speed can be achieved.

Advantageously, the key encryption key generator is configured to generate the at least one key encryption key jointly with the at least one further communication device using a secure key exchange, especially a Diffie-Hellman key exchange. An especially secure key exchange of the key encryption key is thereby possible.

Advantageously, the communication unit is configured to authenticate the at least one further communication device by exchanging certificates with the at least one further communication device during joint key encryption key generation. Thereby, the identity of the individual communication devices is assured. Especially, advantageously, signature keys of the certificates are created and verified during joint key encryption key generation. A further increase in security can thereby be reached.

Further advantageously, the communication device is configured for performing encrypted communication with a plurality of further communication devices within the communication network. The key encryption key generator is then configured to generate a separate key encryption key for each of the further communication devices jointly with the respective further communication device. The traffic encryption key generator is then configured to generate a single traffic encryption key for encrypting all traffic data intended for all further communication devices. The cryptographic unit is in this case configured to encrypt the single traffic encryption key separately for each further communication device using the separate key encryption key of the respective further communication device. Especially for large numbers of devices, the communication device according to the invention is advantageous, since especially there a secure and efficient communication is difficult to achieve.

Advantageously, the communication device is furthermore configured to receive at least one further traffic encryption key, specific to the at least one further communication device, encrypted by the jointly generated key encryption key from the at least one further communication device, using the communication unit. In this case, the cryptographic unit is furthermore configured to decrypt the at least one further traffic encryption key using the jointly generated key encryption key of the at least one further communication device. The communication unit is then configured to receive encrypted further traffic data from the at least one further communication device. The cryptographic unit is furthermore configured to decrypt the further traffic data from the at least one further communication device using the at least one further traffic encryption key. Thereby, it is possible to use the communication device for receiving and transmitting traffic data.

Advantageously, the key encryption key generator is configured for jointly generating a new encryption key for each further communication device regularly. Additionally or alternatively, the traffic encryption key generator is configured for generating a new traffic encryption key regularly. These measures further increase communication security.

Advantageously, the communication device is configured to communicate with a security management device, using the communication unit. The communication device is configured to receive from the security management device a certificate and a private key for authenticating the communication device to the at least one further communication device and/or to receive from the security management device a group configuration of all further communication devices, which the communication device is to communicate with. By performing this offline-authentication with the security management device, it is possible to assure the identity of the further communication devices. It is not necessary to have the security management device available during connection initiation, though.

An inventive communication system comprises at least a first communication device and a second communication device as described earlier.

According to another aspect of the invention a method for performing encrypted communication by a communication device and at least a further communication device in a communication network is provided. The method comprises generating at least one key encryption key jointly by the communication device and the at least one further communication device and generating a traffic encryption key, specific to the communication device for encrypting traffic data transmitted by the communication device.

The method preferably also comprises encrypting the traffic encryption key using the at least one key encryption key and transmitting the encrypted traffic encryption key to the at least one further communication device by the communication device. It is thereby possible to create a secure channel between the communication devices without requiring a constantly available centralized hardware.

Advantageously, the method further comprises encrypting traffic data with the traffic encryption key. Moreover it comprises transmitting the traffic data encrypted with the traffic encryption key, by the communication device. An increased processing speed can be achieved by use of symmetric encryption.

Further advantageously, the method comprises generating the at least one key encryption key jointly by the communication device and the at least one further communication device using a secure key exchange, especially a Diffie-Hellman key exchange. By use of the Diffie-Hellman method and an authentication, man-in-the-middle attacks can be prevented.

Advantageously, the method comprises authenticating the at least one further communication device by exchanging certificates with the at least one further communication device during joint key encryption key generation by the communication device. Thereby, the identity of the individual communication devices is assured. If at the same time an integrity protection is implemented, it is assured, that no man in the middle attacks can occur on the traffic encryption key transmission.

Moreover advantageously, the method comprises performing encrypted communication by the communication device with a plurality of further communication devices in the communication network, generating a separate key encryption key for each of the further communication devices jointly by the communication device and the respective further communication device, generating a single traffic encryption key for traffic data intended for all further communication devices, by the communication device, and encrypting the single traffic encryption key separately for each further communication device, by the communication device, using the separate key encryption key of the respective further communication device.

Advantageously, the method further comprises receiving at least for one further traffic encryption key, specific to the at least one further communication device, by the communication device, wherein the at least one further traffic encryption key is encrypted by the jointly generated key encryption key, decrypting the at least one further traffic encryption key using the jointly generated key encryption key of the at least one further communication device, receiving further traffic data from the at least one further communication device, and decrypting the further traffic data using the at least one further traffic encryption key. Thereby, it is possible to use the communication device for receiving and transmitting traffic data.

Advantageously, the method also comprises jointly generating a new key encryption key for each further communication device and/or a new traffic encryption key regularly. These measures further increase communication security.

Moreover advantageously, the method further comprises communicating with a security management device by the communication device, and receiving from the security management device a certificate and a private key for authenticating the communication device to the at least one further communication device and/or a group configuration of all further communication devices, which the communication device is to communicate with, by the communication device. By performing this offline-authentication with the security management device, it is possible to assure the identity of the further communication devices. It is not necessary to have the security management device available during connection initiation, though.

According to a still further aspect of the invention a computer program with program code means for performing all steps of the previously shown method, if the program is executed on a computer or at least one digital signal processor is provided. Especially an implementation using a plurality of devices or processing units for performing the processing is also possible.

Moreover, a computer program product having a computer readable medium with stored program code means for performing all steps of the previously shown method, if the program is executed on a computer or a digital signal processor, can also be provided.

BRIEF DESCRIPTION OF THE DRAWINGS

An exemplary embodiment of the invention is now further explained by way of example only and with respect to the drawings in which.

DETAILED DESCRIPTION OF THE DRAWINGS

Figure 1:
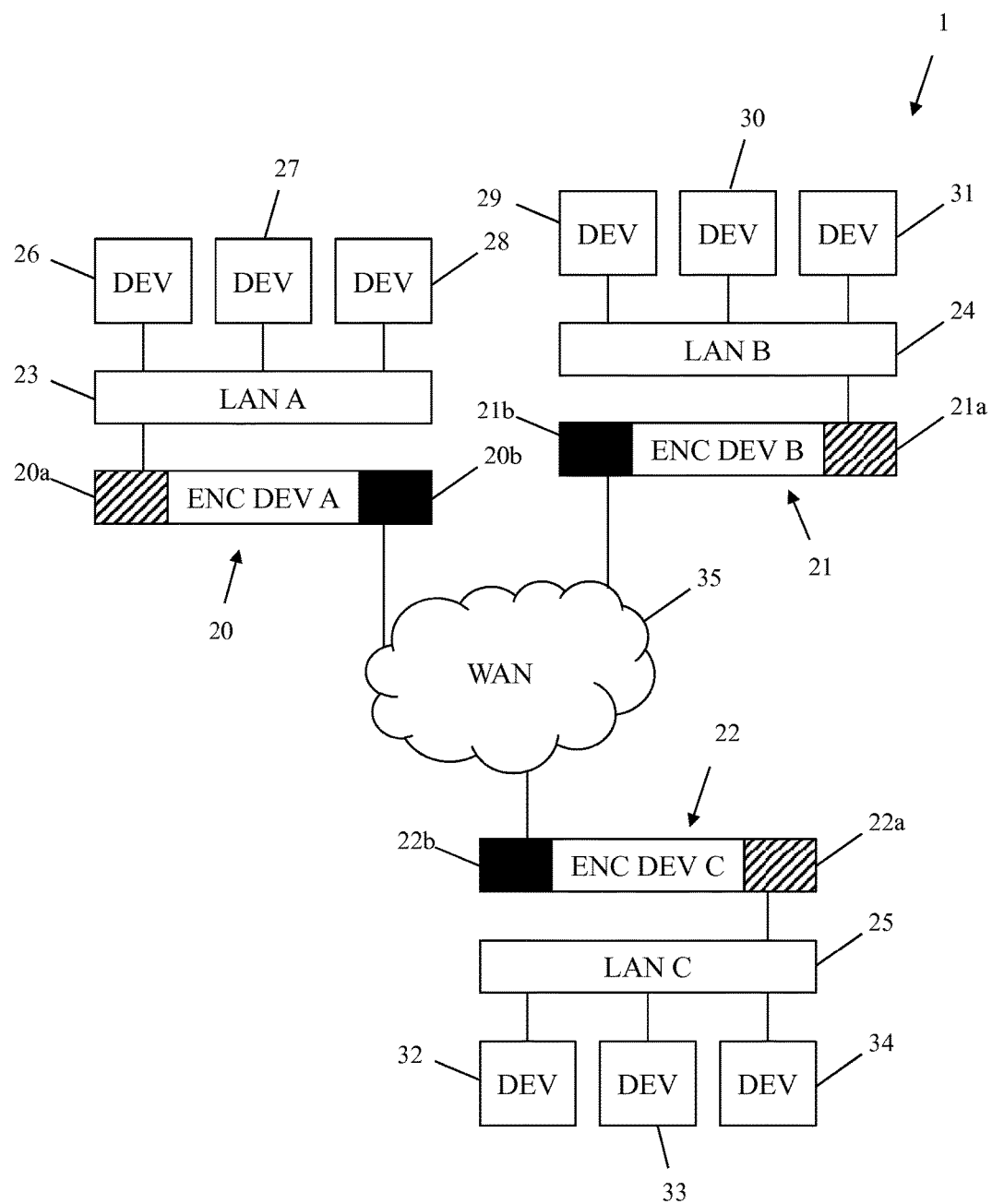
FIG. 1 shows a first embodiment of the inventive communication system.

First we demonstrate the underlying problem and the general construction and functionality of an embodiment of the inventive communication system along FIG. 1. Along FIG. 2, the function of an embodiment of the inventive measuring system and measuring devices is shown. Along FIG. 3, the detailed construction and function of an embodiment of the inventive measuring device is furthermore explained. Finally, along FIG. 4 and FIG. 5, the function of embodiments of the inventive communication method is described. Similar entities and reference numbers in different figures have been partially omitted.

In FIG. 1, an exemplary communication system 1 is shown. A number N of communication devices 20, 21 and 22, which in this case are dedicated encryption devices, are connected to a wide area network 35 with their respective encrypted side black 20b, 21b, 22b. Connected to red sides 20a, 21a, 22a of the communication devices 20, 21 and 22 are in this example local area networks 23, 24 and 25, which each are connected to a number of individual devices 26-34.

The communication devices 20, 21 and 22 perform encrypted communication with each other. The traffic data to encrypt is provided by the individual devices 26-34 through the local area networks 23, 24 and 25. For the further description, only the communication between the communication devices 20, 21 and 22 is shown in detail. The non-encrypted communication between the individual devices 26-34 and the communication devices 20, 21 and 22 is not described here, since it is not relevant for the invention.

By use of the invention, it is possible for the communication devices 20, 21 and 22 to communicate with each other, jointly generate keys, exchange these, and then perform encrypted traffic communication between each other. By the inventive communication device and method, especially the requirements of multipoint networks are fulfilled. Especially in networks with a great number of communication devices a very simple and secure communication can be achieved.

The inventive device and method are based on the following basic concepts:

All communication devices participating in the encrypted communication generate security associations in a pairwise manner. This is done by each of the communication devices jointly generating a key encryption key with each further of the communication devices. This key encryption key is then used for transmitting a traffic encryption key in a secure manner. It is possible to define device groups for limiting the security associations to members of a specific group.

Each communication device generates traffic encryption keys and transmits these to all communication devices, which are to communicate with the communication device which has generated the traffic encryption key and to which it has generated a security association. The transmission of the traffic encryption keys is protected, especially encrypted and integrity-protected, by the respective key encryption key of the pair of communication devices. The traffic encryption key of a single communication device is transmitted to all other communication devices, it is to communicate with. The traffic encryption key of a communication device is used only by the generating communication device for encrypting traffic data transmitted by this communication device. All other communication devices only use the traffic encryption key for decrypting the traffic data encrypted therewith.

It is possible to use the traffic encryption key of the individual communication device for encryption and for integrity assurance of data, which is received on the red side 20a, 21a, 22a from the local area networks.

Traffic encryption keys of further communication devices are used for decrypting and integrity verification of data, which arrives at the black side 20b, 21b, 22b from the WAN-side. Decrypted data is only sent to the red side 20a, 21a, 22a, if the integrity verification by the communication devices 20, 21 and 22 is successful.

The present invention has the advantage that no central always online key server is necessary, which conventionally has to be connected by the individual communication devices for establishing a secure connection between each other by providing traffic encryption keys. According to the invention, it is possible to configure the communication devices in such a manner, that they no longer require online-access to a key server. This is achieved by transmitting a device certificate and an according private key and a root certificate to the respective communication device. The authenticity of device certificates of other communication devices can then be checked. This data can be supplied to the respective communication device when the device is initialized before being brought to the area of use.

Advantageously, when performing an encryption of traffic data, each packet is supplied with an information indicating the originating communication device, so that the target communication device can select the correct received traffic encryption key for decrypting the traffic data.

Advantageously, in all instances, where encryption and decryption are performed, also an integrity protection is implemented. This means that when encrypting, integrity protection is added and when decrypting, the integrity is checked.

Figure 2:
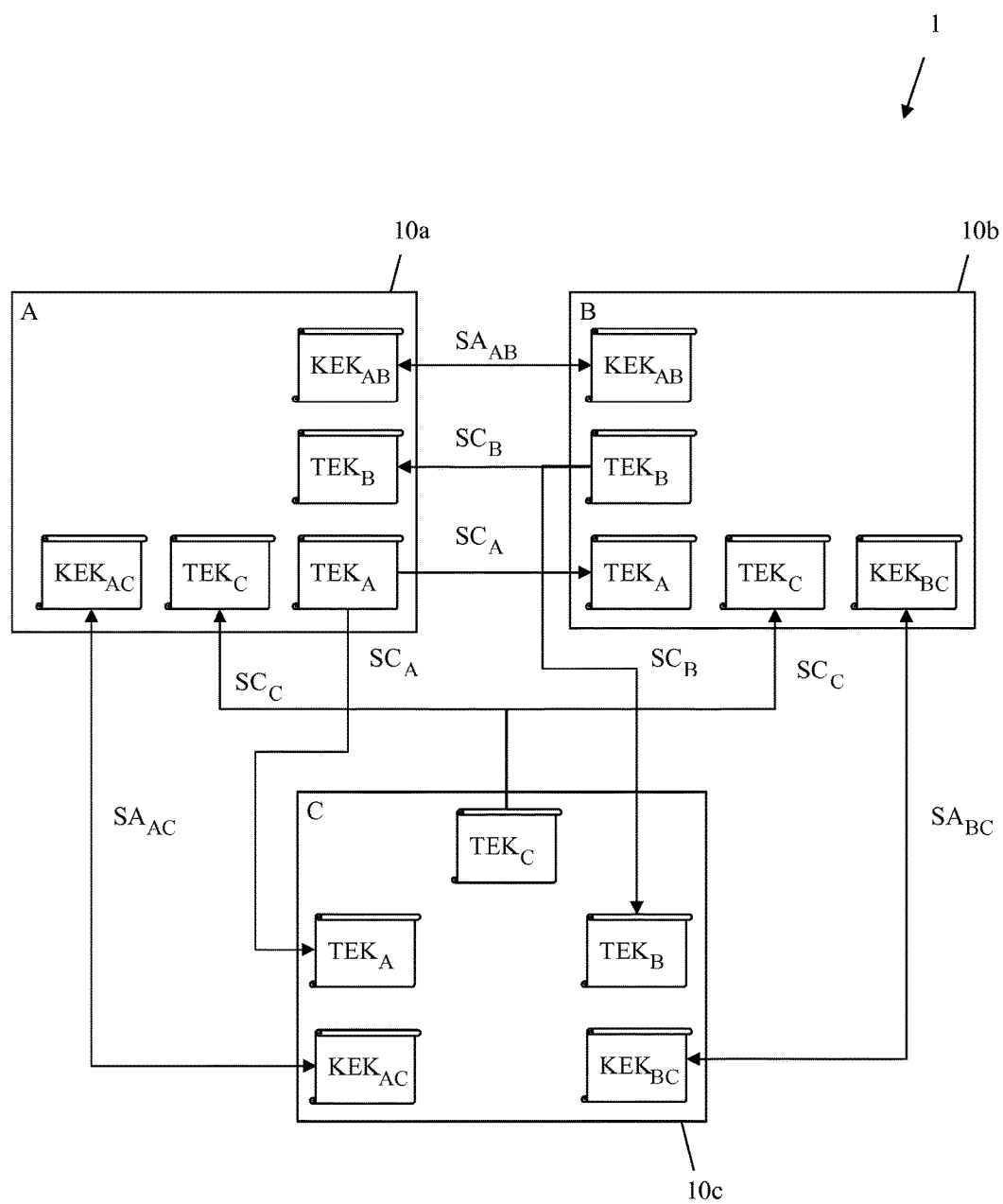
FIG. 2 shows exemplary relationships between different communication devices according to a second embodiment of the invention.

In FIG. 2, three communication devices 10a, 10b and 10c according to an embodiment of the invention within a communication network 1 are shown. Here, the different keys, which the communication devices 10a, 10b and 10c have, are shown. For example, the communication device 10a has a key encryption key $KEK_{AB}$ which has been jointly generated with the communication device 10b. The communication device 10b has the same key encryption key $KEK_{AB}$. The communication device 10a and the communication device 10b form a security association $SA_{AB}$ by use of the key encryption key $KEK_{AB}$. A similar security association $SA_{AC}$ is formed between the communication devices 10a and 10c using a key encryption key $KEK_{AC}$. Also, a similar security association $SA_{BC}$ is established between the communication devices 10b and 10c using a key encryption key $KEK_{BC}$. As soon as a security association $SA_{AB}$, $SA_{AC}$, $SA_{BC}$ has been established, the respective communication device 10a, 10b and 10c generates a traffic encryption key $TEK_A$, $TEK_B$, $TEK_C$ and transmits it to all other communication devices 10a, 10b and 10c. During this transmission, the traffic encryption key $TEK_A$, $TEK_B$, $TEK_C$ is encrypted using the respective key encryption key established between the two communication devices 10a, 10b and 10c.

A security association (SA) is a 1:1 relationship between two communication devices. Each security association is associated with a key encryption key, which is used for encrypted and authenticated transmission of traffic encryption keys and other parameters between the communication devices 10a, 10b and 10c. Security associations are formed proactively between partner communication devices or on demand, if encrypted traffic data is received from a communication device, so far no security association exists to.

A secure channel (SC) is a 1:N relationship between a transmitting communication device and N receiving communication devices. The traffic encryption key is only used for encrypting traffic data which is sent by the communication device, which has generated the traffic encryption key and for decrypting this encrypted traffic data by the N further communication devices.

Figure 3:
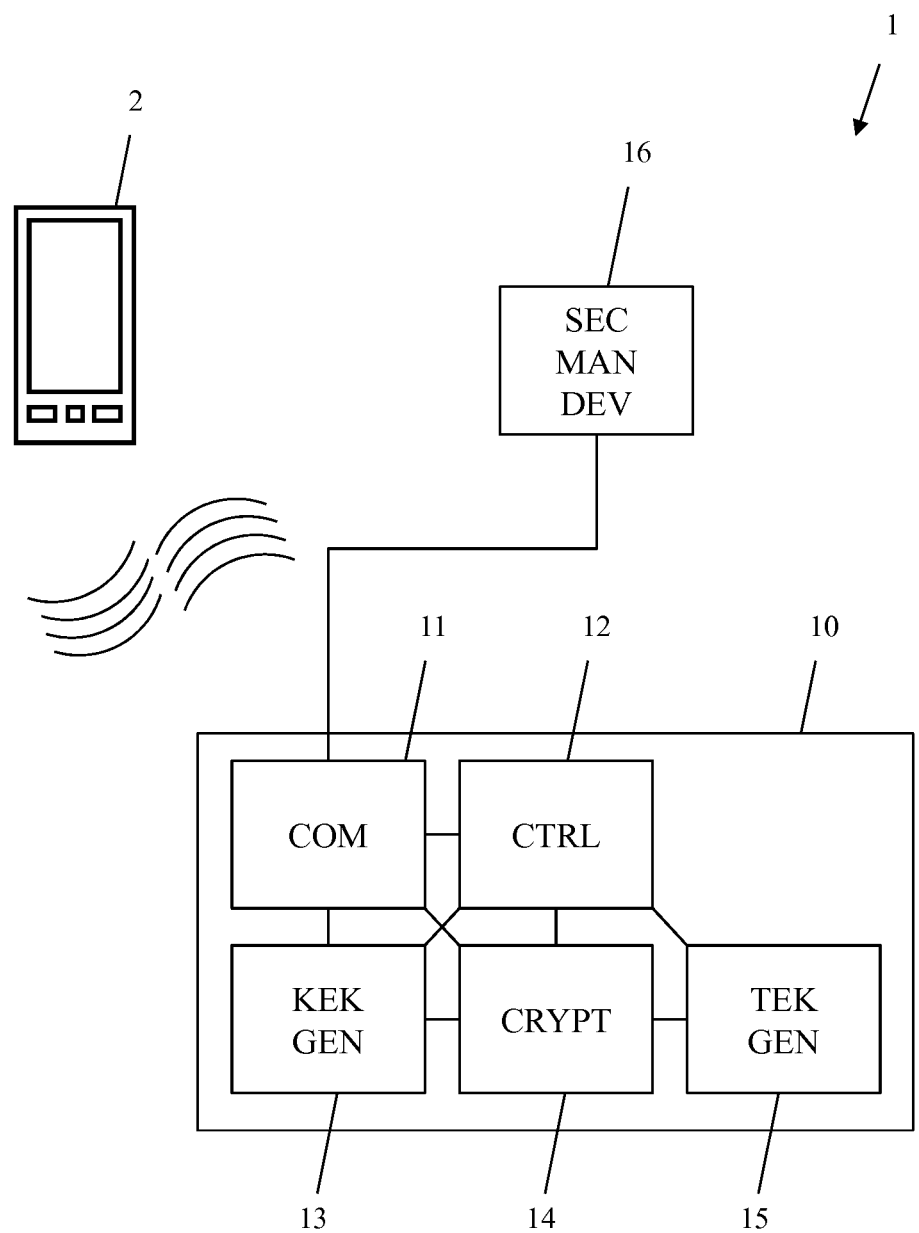
FIG. 3 shows a communication device and a further communication device according to a third embodiment of the invention.

In FIG. 3, a detailed block diagram showing an embodiment of the inventive communication device 10 and further devices of the communication system 1 are shown. The communication device 10 comprises a communication unit 11, a control unit 12, a key encryption key generator 13, a cryptographic unit 14 and a traffic encryption key generator 15. A control unit 12 is connected to all other units 11, 13, 14 and 15. Moreover, the cryptographic unit 14 is connected to all other units 11, 12, 13 and 15.

Furthermore, the communication unit 11 is connected to the key encryption key generator 13.

The communication system 1 furthermore comprises a further communication device 2, which is advantageously constructed identical as the communication device 10. Furthermore the communication system 1 can optionally comprise a security management device 16. Both, the further communication device 2 and the security management device 16 communicate with the communication unit 11 of the communication device 10. In this example, the further communication device 2 communicates wirelessly with the communication unit 11 of the communication device 10, while the security management device 16 communicates through a wired connection to the communication unit 11 of the communication device 10. This is though not mandatory. Both connections can be wired or wireless independent of each other. For example, in a stationary communication system, all devices could be connected through an ethernet, as for example shown in FIG. 1.

For performing an encrypted communication with each other, the communication device 10 and the further communication device 2 first of all establish a security association between each other, as shown along FIG. 2. This is done by the key encryption key generator 13 and the communication unit 11 jointly generating a key encryption key with the further communication device 2. This joint key generation can for example be performed using the Diffie-Hellman algorithm. Thereby, by use of an asymmetric encryption process, both the communication device 10 and the further communication device 2 afterwards comprise a secret key encryption key. Now the traffic encryption key generator 15 of the communication device 10 generates a traffic encryption key, which is used for encrypting all traffic data transmitted by the communication device 10. The traffic encryption key generated by the traffic encryption key generator 15 is encrypted by the cryptographic unit 14 using the key encryption key jointly generated with the further communication device 2.

The encrypted traffic encryption key is then transmitted to the further communications device 2 by the communication unit 11. The further communication device 2 then decrypts the encrypted traffic encryption key using the already known key encryption key, it has jointly generated with the key encryption key generator 13 of the communication device 10. The further communication device 2 can now use the decrypted traffic encryption key for decrypting traffic data, which it has received from the communication device 10.

Advantageously, the function of the communication device 10 and the further communication device 2 is exchangeable. This means, that advantageous the communication system 1 comprises at least two, or a plurality of communication devices, which can communicate with each other as explained above.

Optionally, the communication system 1 furthermore comprises a security management device 16, which transmits certificates for authenticating the communication devices between each other to the communication devices. This transmission though does not have to happen online, when the communication devices wish to communicate with each other, but can happen offline, for example when the devices are first initialized. Also, the security management device 16 can provide the devices with group configurations including all communication devices, which the individual communication device is authorized to communicate with.

These certificates can also be used for authenticating the communication devices between each other when the security management device 16 is not available.

It is therefore not necessary to have the security management device 16 present within the communication network 1 at all times. It is also possible to supply the devices with the certificates during construction.

Advantageously, the key encryption key and the traffic encryption key are updated regularly. This serves the purpose of making a brute-force decryption extremely difficult.

Figure 4:
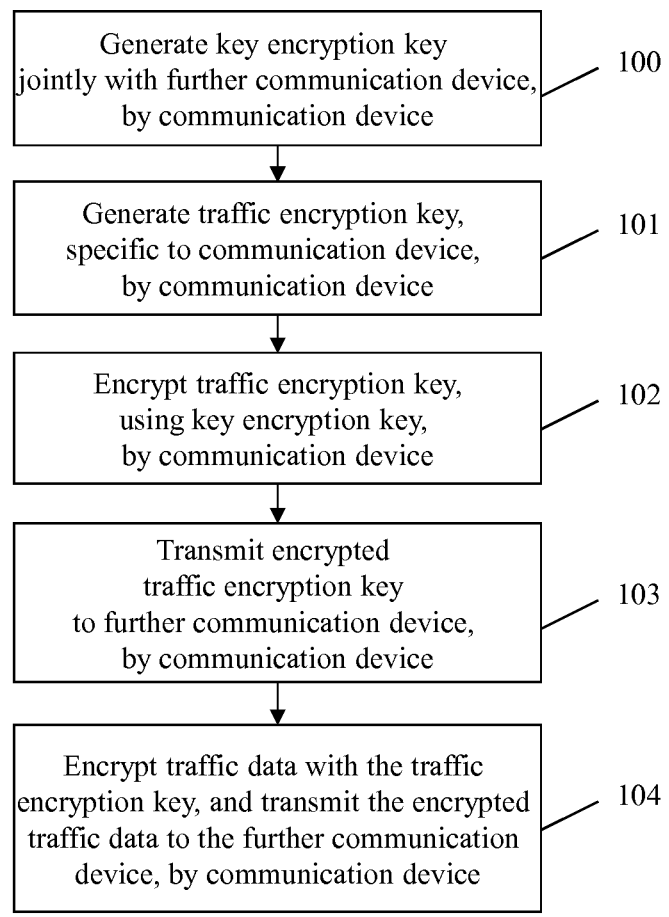
FIG. 4 shows a first embodiment of the inventive method.

In FIG. 4, a first embodiment of the inventive communication method is shown. The method shown in the flow diagram of FIG. 4 corresponds to method steps performed on a traffic data transmitting side. In a first step 100, a key encryption key is generated jointly by a communication device and a further communication device. In a second step 101, a traffic encryption key specific to the communication device is generated by the communication device. In a third step 103 the traffic encryption key is encrypted using the key encryption key, by the communication device. In a fourth step 103 the encrypted traffic encryption key is transmitted from the communication device to the further communication device. In a fifth step 104, traffic data is encrypted with the traffic encryption key and transmitted to the further communication device.

In this figure, the division between the red side and the black side of the communication is not shown. In practice, after step 103, traffic data is received on the red side. In step 104, this traffic data is encrypted as described and a checksum and an information regarding a device ID are added. After this is done, the encrypted traffic data is transmitted on the black side.

Figure 5:
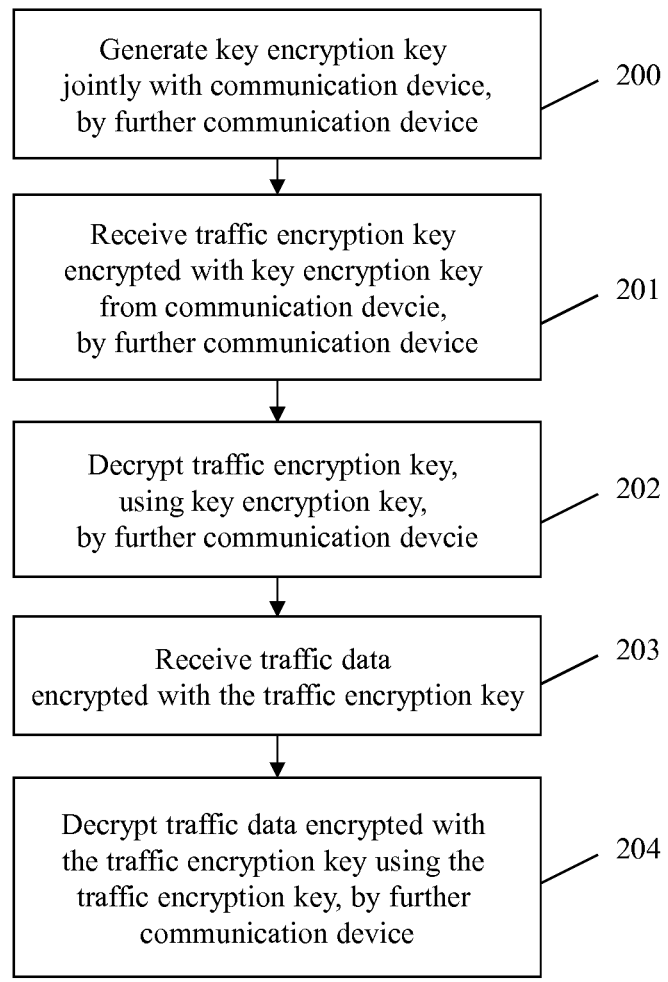
FIG. 5 shows a second embodiment of the inventive method.

In FIG. 5, on the other hand in a flow diagram method steps on a traffic data receiving side are shown. Also here, in a first step, a key encryption key is jointly created by a communication device and a further communication device. In a second step 201, a traffic encryption key encrypted with the priorly generated key encryption key is received from the communication device by the further communication device. In a third step 202 the traffic encryption key is decrypted using the key encryption key by the further communication device. In a forth step 203, traffic data encrypted with the traffic encryption key is received by the further communication device. In a final step 204, the encrypted traffic data is decrypted using the traffic encryption key, by the further communication device.

Also in this figure, the division between the red side and the black side of the communication is not shown. In practice, in step 203, traffic date is received on the black side in an encrypted manner. In step 204, this traffic data is decrypted and verified. After this is done, the decrypted traffic data is transmitted on the red side.

The invention is not limited to the examples shown in the figures. Especially, it is not limited to mobile communication devices. The invention can also be used in stationary computer networks. Instead of the Diffie-Hellman algorithm, also other methods of joint key generation can be used. The characteristics of the exemplary embodiments can be used in any advantageous combination.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A communication device for performing encrypted communication with at least a further communication device in a communication network, comprising a communication unit, and a cryptographic unit, wherein the communication device further comprises:
    a key encryption key generator configured to generate at least one key encryption key jointly with the at least one further communication device, using the communication unit,
    a traffic encryption key generator configured to generate a traffic encryption key, specific to the communication device, for encrypting traffic data transmitted by the communication device,
    wherein the communication device is configured to receive at least one further traffic encryption key, specific to the at least one further communication device, encrypted by the jointly generated key encryption key from the at least one further communication device, using the communication unit,
    wherein the communication unit is configured to receive encrypted further traffic data from the at least one further communication device, and
    wherein the cryptographic unit is configured to:
    decrypt the at least one further traffic encryption key using the jointly generated key encryption key of the at least one further communication device,
    decrypt the further traffic data from the at least one further communication device using the at least one further traffic encryption key.

2. The communication device according to claim 1, wherein the cryptographic unit is configured to encrypt the traffic encryption key using the at least one key encryption key, and that the communication unit is configured to transmit the encrypted traffic encryption key to the at least one further communication device.

3. The communication device according to claim 1, wherein the cryptographic unit is configured to encrypt the traffic data with the traffic encryption key, the communication unit is adapted to transmit the traffic data encrypted with the traffic encryption key.

4. The communication device according to claim 1, wherein the key encryption key generator is configured to generate the at least one key encryption key jointly with the at least one further communication device using a secure key exchange.

5. The communication device according to claim 4, wherein the secure key exchange includes a Diffie-Hellman key exchange.

6. The communication device according to claim 1,
    wherein the communication device is configured for performing encrypted communication with a plurality of further communication devices in the communication network,
    that the key encryption key generator is configured to generate a separate key encryption key for each of the further communication devices jointly with the respective further communication device,
    wherein the traffic encryption key generator is configured to generate a single traffic encryption key for encrypting all traffic data intended for all further communication devices, and
    wherein the cryptographic unit is configured to encrypt the single traffic encryption key separately for each further communication device using the separate key encryption key of the respective further communication device.

7. The communication device according to claim 1, wherein the communication unit is configured to authenticate the at least one further communication device by exchanging certificates with the at least one further communication device, signing exchanged messages, and verifying the exchanged messages using the certificates, during joint key encryption key generation.

8. The communication device according to claim 1,
    wherein the key encryption key generator is configured for jointly generating a new key encryption key for each further communication device regularly, and/or
    wherein the traffic encryption key generator is configured for generating a new traffic encryption key regularly.

9. The communication device according to claim 1,
    wherein the communication device is configured to communicate with a security management device, using the communication unit, and
    wherein the communication device is configured to receive, from the security management device, a certificate and private key for authenticating the communication device to the at least one further communication device and/or a group configuration of all further communication devices, which the communication device is to communicate with.

10. A communication system comprising at least a first communication device and at least a second communication device according to claim 1.

11. A method for performing encrypted communication by a communication device and at least a further communication device in a communication network, wherein the method comprises:
    generating at least one key encryption key jointly by the communication device and the at least one further communication device,
    generating a traffic encryption key, specific to the communication device, for encrypting traffic data transmitted by the communication device,
    receiving at least one further traffic encryption key, specific to the at least one further communication device, by the communication device, wherein the at least one further traffic encryption key is encrypted by the jointly generated key encryption key, decrypting the at least one further traffic encryption key using the jointly generated key encryption key of the at least one further communication device, receiving encrypted further traffic data from the at least one further communication device, decrypting the further traffic data using the at least one further traffic encryption key.

12. The method according to claim 11, wherein the method further comprises:

encrypting the traffic encryption key using the at least one key encryption key, and transmitting the encrypted traffic encryption key to the at least one further communication device, by the communication device.

13. The method according to claim 11, wherein the method further comprises:

encrypting the traffic data with the traffic encryption key, and transmitting the traffic data encrypted with the traffic encryption key, by the communication device.

14. The method according to claim 11, wherein the method further comprises generating the at least one key encryption key jointly by the communication device and the at least one further communication device using a secure key exchange.

15. The method according to claim 14, wherein the secure key exchange includes a Diffie-Hellman key exchange.

16. The method according to claim 11, wherein the method comprises:

performing encrypted communication by the communication device with a plurality of further communication devices in the communication network, generating a separate key encryption key for each of the further communication devices jointly by the communication device and the respective further communication device, generating a single traffic encryption key for traffic data intended for all further communication devices, by the communication device, and encrypting the single traffic encryption key separately for each further communication device, by the communication device, using the separate key encryption key of the respective further communication device.

17. The method according to claim 11, wherein the method further comprises authenticating the at least one further communication device by exchanging certificates with the at least one further communication device, signing exchanged messages, and verifying the exchanged messages using the certificates, during joint key encryption key generation, by the communication device.

18. The method according to claim 11, wherein the method further comprises:

jointly generating a new key encryption key for each further communication device regularly, and/or generating a new traffic encryption key regularly.

19. The method according to claim 11, wherein the method further comprises:

communicating with a security management device, by the communication device, and receiving from the security management device a certificate and private key for authenticating the communication device to the at least one further communication device and/or a group configuration of all further communication devices, which the communication device is to communicate with, by the communication device.

20. A computer program with program code means for performing a program code for performing encrypted communication by a communication device and at least a further communication device in a communication network, wherein the program code comprises:

generating at least one key encryption key jointly by the communication device and the at least one further communication device, generating a traffic encryption key, specific to the communication device, for encrypting traffic data transmitted by the communication device, receiving at least one further traffic encryption key, specific to the at least one further communication device, encrypted by the jointly generated key encryption key from the at least one further communication device using the communication unit, receiving encrypted further traffic data from the at least one further communication device, decrypting the at least one further traffic encryption key using the jointly generated key encryption key of the at least one further communication device, decrypting the further traffic data from the at least one further communication device using the at least one further traffic encryption key.

* * * * *